(12) United States Patent
Dussillols et al.

(10) Patent No.: US 7,810,335 B2
(45) Date of Patent: Oct. 12, 2010

(54) CORE EXHAUST MIXER, HAVING A VARIABLE AREA, FOR TURBO-FAN JET ENGINES OF SUPERSONIC AIRCRAFT

(75) Inventors: Laurent Dussillols, Melun (FR); Alexandre Alfred Gaston Vuillemin, Paris (FR)

(73) Assignee: Snecma, Paris (FR)

( * ) Notice: Subject to any disclaimer, the term of this patent is extended or adjusted under 35 U.S.C. 154(b) by 951 days.

(21) Appl. No.: 11/620,295

(22) Filed: Jan. 5, 2007

(65) Prior Publication Data

US 2007/0163230 A1 Jul. 19, 2007

(30) Foreign Application Priority Data

Jan. 13, 2006 (FR) .................................. 06 50127

(51) Int. Cl.
*F02K 1/00* (2006.01)

(52) U.S. Cl. ...................... 60/770; 181/213; 239/265.13

(58) Field of Classification Search ................ 60/770, 60/771, 226.1, 262, 39.5, 226.3, 230; 239/265.13, 239/265.17; 181/213, 220; 244/11 B
See application file for complete search history.

(56) References Cited

U.S. PATENT DOCUMENTS

| 3,174,282 | A | | 3/1965 | Harrison | |
|---|---|---|---|---|---|
| 3,409,228 | A | * | 11/1968 | Mehr | 239/127.3 |
| 3,612,209 | A | * | 10/1971 | Vdoviak et al. | 60/232 |
| 3,695,387 | A | * | 10/1972 | Hilbig | 181/219 |
| 4,052,847 | A | * | 10/1977 | Rodgers et al. | 60/262 |
| 4,285,194 | A | * | 8/1981 | Nash | 60/762 |
| 4,501,393 | A | * | 2/1985 | Klees et al. | 239/265.13 |
| 4,909,346 | A | * | 3/1990 | Torkelson | 181/213 |
| 4,958,489 | A | * | 9/1990 | Simmons | 60/226.3 |
| 5,269,139 | A | | 12/1993 | Klees | |
| 5,291,672 | A | * | 3/1994 | Brown | 60/262 |
| 5,761,899 | A | * | 6/1998 | Klees | 60/204 |
| 5,779,150 | A | * | 7/1998 | Lidstone et al. | 239/265.13 |
| 5,826,794 | A | * | 10/1998 | Rudolph | 239/265.17 |
| 5,884,472 | A | * | 3/1999 | Presz et al. | 60/262 |
| 5,884,843 | A | | 3/1999 | Lidstone et al. | |
| 5,908,159 | A | * | 6/1999 | Rudolph | 239/265.17 |
| 6,050,527 | A | * | 4/2000 | Hebert et al. | 244/210 |
| 6,935,098 | B2 | * | 8/2005 | Bardagi et al. | 60/262 |
| 2008/0236167 | A1 | * | 10/2008 | Dussillols et al. | 60/771 |

FOREIGN PATENT DOCUMENTS

EP 0 913 568 A2 5/1999

* cited by examiner

*Primary Examiner*—William H Rodríguez
(74) *Attorney, Agent, or Firm*—Oblon, Spivak, McClelland, Maier & Neustadt, L.L.P.

(57) ABSTRACT

The invention relates to a core exhaust mixer, having a variable area, for turbo-fan jet engines of supersonic aircraft, comprising a nozzle (24) intended to be arranged about a gas generator of the jet engine, the nozzle comprising a plurality of external air intake apertures (30) emerging in a convergence zone between cold and hot flows from the gas generator and in which lobes (32), movable between two positions, are mounted; a first position in which they block the apertures (30) of the nozzle (24) and a second position, different from the first, in which they unblock said apertures and extend radially into the nozzle (24) in order to admit external air, the lobes (32) having an azimuthal component in the same direction in order to give a swirling motion to the external air admitted into the convergence zone when the lobes are in the second position.

8 Claims, 3 Drawing Sheets

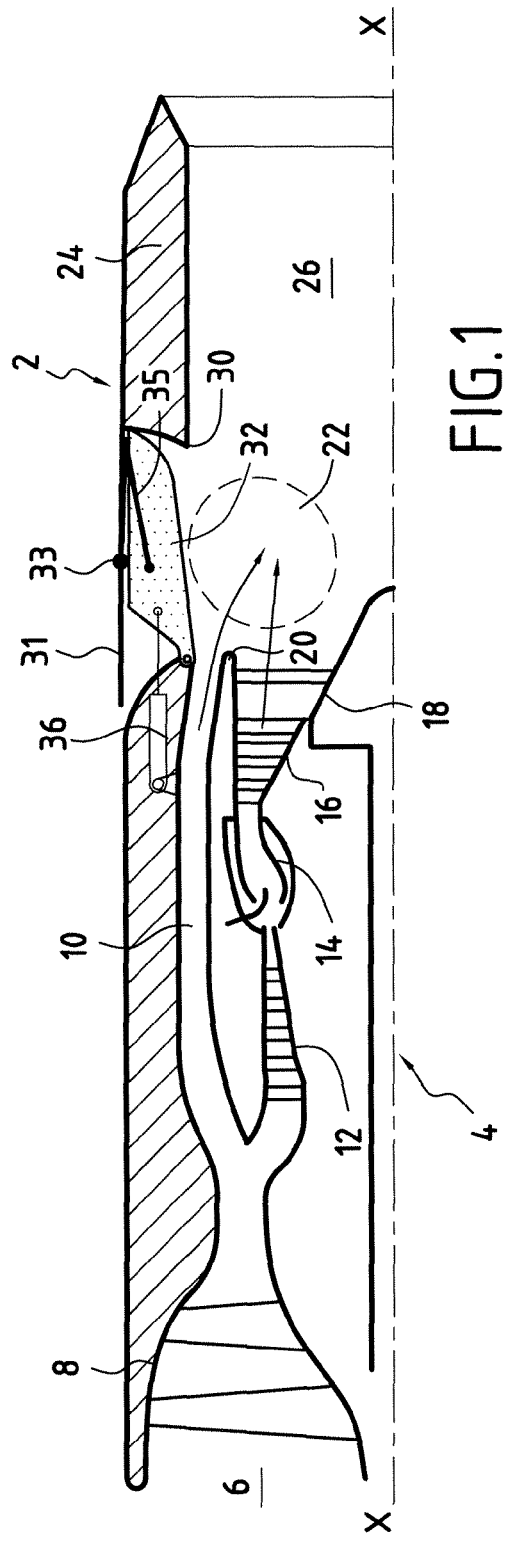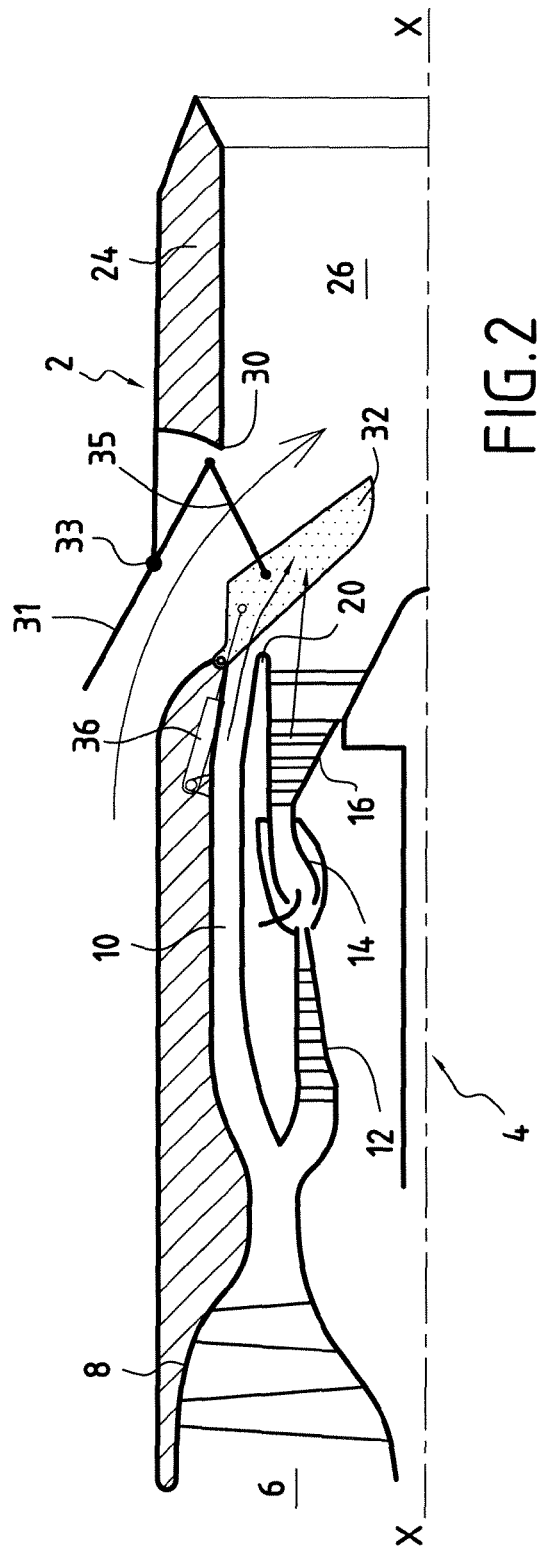

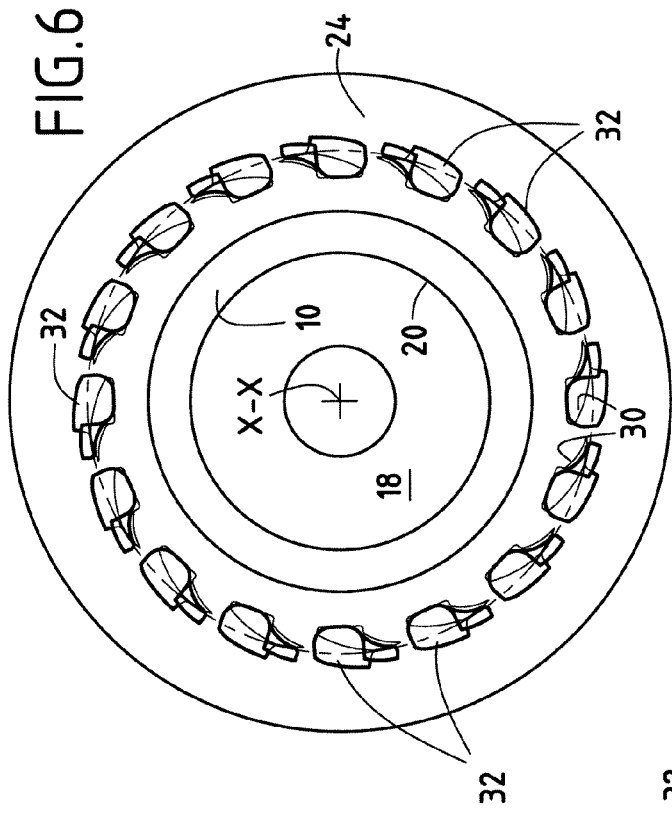
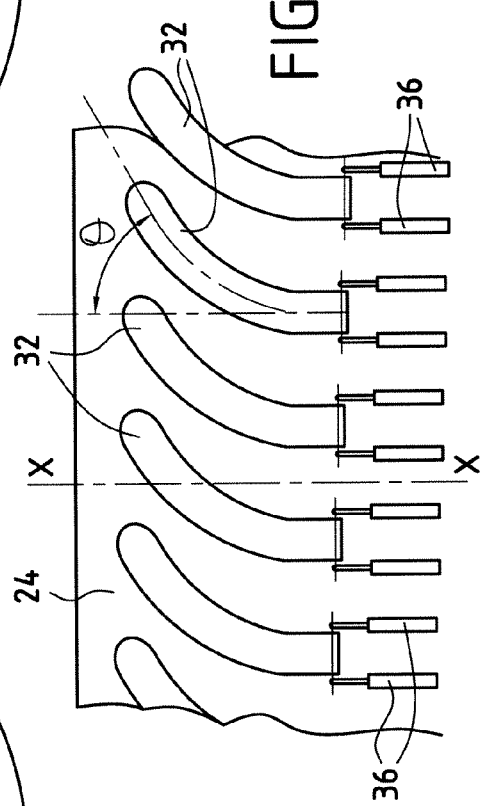
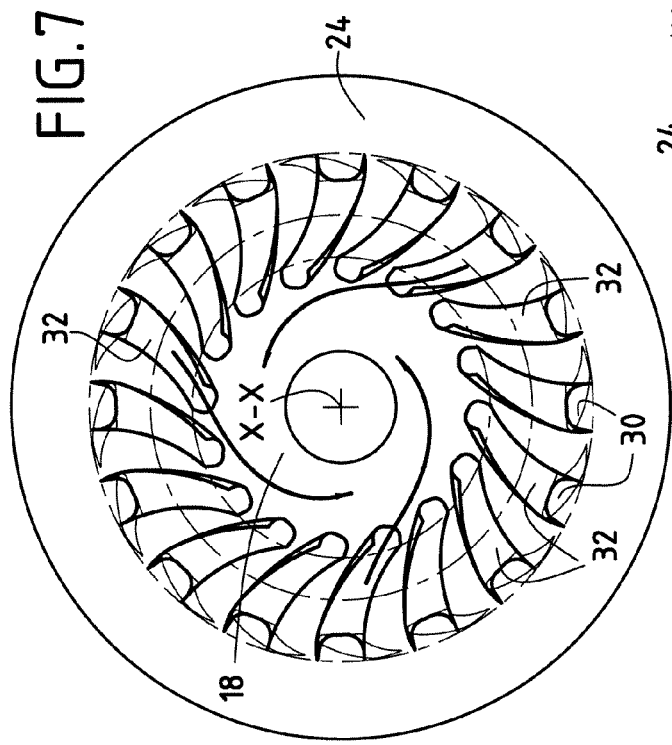

CORE EXHAUST MIXER, HAVING A VARIABLE AREA, FOR TURBO-FAN JET ENGINES OF SUPERSONIC AIRCRAFT

BACKGROUND OF THE INVENTION

The present invention relates to the general field of core exhaust mixers, having a variable area, for turbo-fan jet engines with low by-pass ratio for supersonic aircraft.

A turbo-fan jet engine with low by-pass ratio for supersonic aircraft is composed primarily of a dual-flow gas generator (cold flow and hot flow) prolonged by a nozzle, which defines a gas ejection passage.

Turbo-fan jet engines with low by-pass ratio equipping supersonic aircraft, which are intended for civil aviation, must meet two requirements: on the one hand, they must have the lowest possible drag in flight during transonic and supersonic cruising, and on the other hand, they must have an acceptable noise level during takeoff of the aircraft, the certification authorities being increasingly demanding as regards sound emissions from the jet engines of civil aircraft.

However, these two requirements are contradictory. In fact, the first requirement leads to jet engine architectures of small diameter, while the second requirement requires the thrust to be increased by augmenting the gas output, which leads to large fan (and thus jet engine) diameters.

A known solution meeting these requirements is the use of a core exhaust mixer having a variable area. A mixer of this type makes it possible, during the takeoff phases of the aircraft, to introduce into the jet engine an air flow, external to the jet engine, in order to mix it with the gas flow coming from the gas generator. In fact, mixing external air with the gas flow coming from the gas generator makes it possible to augment the gas output produced by the jet engine. Also, at constant thrust, the ejection speed of the gases can be reduced, compared to a turbo-fan jet engine without a mixer. As the jet noise increases with the ejection speed of the gases, reduction in this speed generates a significant drop in noise level during takeoff.

In practice, external air is introduced into the jet engine downstream of the gas generator using apertures distributed over the entire circumference of the nozzle. The air introduced in this way mixes with the gas flow from the gas generator by means of guides which extend radially through the ejection passage of the gas flow. These guides are movable between a position in which they unblock the apertures and allow mixing (during the takeoff phases of the aircraft) and another position in which they block the apertures during the other flight phases.

Although satisfactory, this solution is disadvantageous in that significant lengthening of the jet engine is required in order to assist mixing of the external air flow and the gas flow from the gas generator. However, the jet engine is lengthened to the detriment of its size. Moreover, it is generally necessary to use an acoustic lining on the internal wall of the exhaust nozzle of the jet engine, in order to absorb the most harmful sound frequencies.

OBJECT AND SUMMARY OF THE INVENTION

It is therefore a principal object of the present invention to mitigate such drawbacks by proposing a core exhaust mixer having a variable area, which makes it possible to reduce the jet noise level of the jet engine during takeoff, with small overall dimensions.

This object is achieved thanks to a core exhaust mixer having a variable area for turbo-fan jet engines of supersonic aircraft, comprising a substantially cylindrical nozzle centered on a longitudinal axis of the jet engine and intended to be arranged concentrically about a gas generator of the jet engine, the nozzle comprising a plurality of external air intake apertures distributed over its entire circumference, emerging in a convergence zone between cold and hot flows from the gas generator and in which lobes, movable between two positions, are mounted; a first position in which they block the apertures of the nozzle and a second position, different from the first, in which they unblock said apertures and extend radially into the nozzle in order to allow air, external to the jet engine, to enter said convergence zone, and in which, in accordance with the invention, the lobes present an azimuthal component in the same direction so as to give a swirling motion to the external air admitted into the convergence zone when the lobes are in the second position.

The use of lobes having an azimuthal component substantially assists mixing of the air flow, external to the jet engine, and the gas flow from the gas generator (mixing of cold and hot flows). Indeed, the swirling of the air which is generated by this particular shape of the lobes increases the shearing effects existing in the convergence zone between cold and hot flows from the gas generator. With identical acoustical performance, it is thus possible to shorten the length of the jet engine (and thus decrease its weight) compared to a jet engine provided with a traditional mixer. In the same way, with the same length of jet engine, it is possible to reduce the jet noise during takeoff compared to a jet engine provided with a traditional mixer.

The lobes can have a substantially U-shaped cross section.

Preferably, each lobe is articulated on the nozzle at an upstream end by means of a rotary pin and is moved into the two positions by means of at least one jack.

The nozzle moreover may comprise a plurality of pivoting scoops mounted in the apertures and each connected to a lobe.

Another object of the invention is a jet engine for supersonic aircraft comprising a core exhaust mixer having a variable area as defined above.

SHORT DESCRIPTION OF THE DRAWINGS

Other features and advantages of this invention will become apparent from the description given below, with reference to the appended drawings which illustrate an exemplary embodiment, the nature of which is not restrictive in any way.

In the figures:

FIGS. 1 and 2 are diagrammatic semi-views in longitudinal section of a jet engine provided with a core exhaust mixer having a variable area according to the invention in its two positions of use;

FIG. 5 is a detailed view of the lobes of the mixer in FIGS. 1 and 2; and

FIGS. 6 and 7 are frontal views of the mixer in FIGS. 1 and 2.

DETAILED DESCRIPTION OF AN EMBODIMENT

Figure 3:
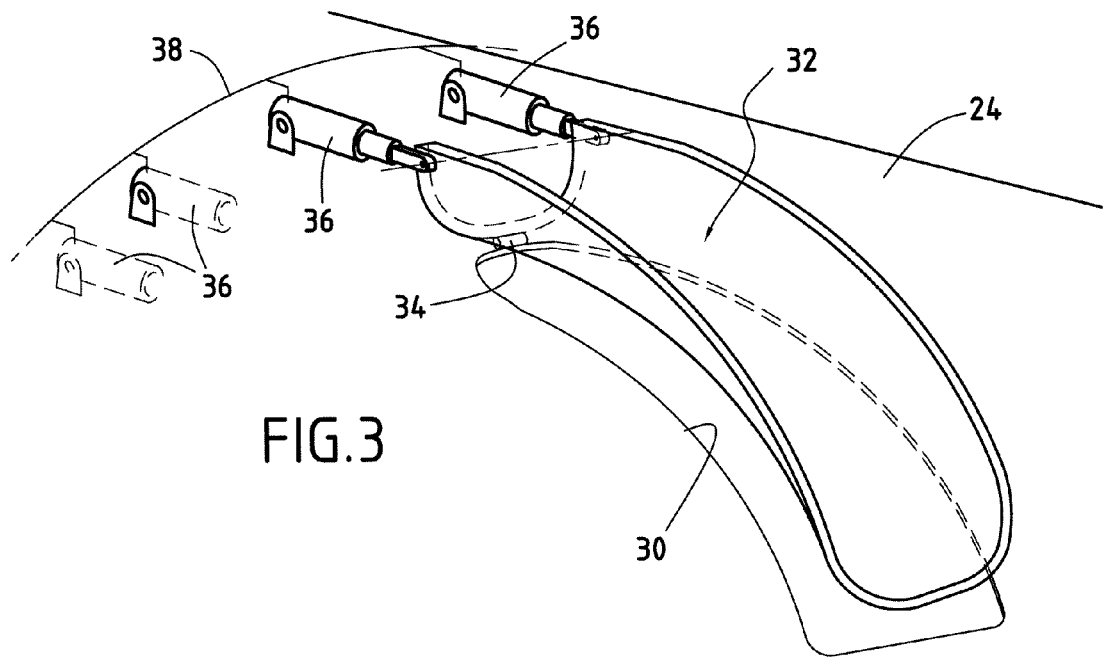
FIGS. 3 and 4 are views in perspective of a lobe of the mixer in FIGS. 1 and 2.

FIGS. 1 and 2 are semi-views in longitudinal section of a turbo-fan jet engine with low by-pass ratio for supersonic aircraft.

A jet engine 2 of this kind is composed primarily of a gas generator 4 with longitudinal axis X-X partially illustrated in FIGS. 1 and 2.

In a manner known per se the latter has an air intake 6, a low pressure compressor 8 feeding air partly to a cold flow exhaust passage 10 and partly to a high-pressure compressor 12.

At the exit of the high-pressure compressor 12, the compressed air is mixed with fuel in a combustion chamber 14 and ignited there. The gases resulting from this combustion drive a turbine 16, before being evacuated through hot flow exhaust passage 18.

An annular ring 20 separates the cold flow exhaust passage 10 from the hot flow exhaust passage 18. Downstream of this ring, cold and hot flows mix in a zone 22 called the convergence zone.

The jet engine also comprises a substantially cylindrical nozzle 24 which is centered on the longitudinal axis X-X of the jet engine. The nozzle 24 is arranged concentrically about the gas generator, downstream of the latter, and defines a gas ejection passage 26.

The nozzle 24 comprises a plurality of external air intake apertures 30 which are distributed over its entire circumference. These apertures 30 open towards the outside of the jet engine and emerge in the ejection passage 26 substantially around the convergence zone 22 between the cold and hot flows from the gas generator.

In each aperture 30 there is mounted a lobe 32 movable between two different positions: a first position (FIGS. 1, 3 and 6) called the closed position in which the lobe blocks the corresponding aperture and a second position (FIGS. 2, 4 and 7) called the open position in which the lobe unblocks the corresponding aperture.

The closed position corresponds to all flight phases of the supersonic aircraft equipped with the jet engine, except the takeoff phases (for example the supersonic cruising phases). In this position, lobes 32 are retracted in order to block apertures 30 so that no air external to the jet engine is admitted into the ejection passage 26.

The open position corresponds to the takeoff phases of the supersonic aircraft equipped with the jet engine. In this position, lobes 32 are deployed in order to extend radially through ejection passage 26. They are thus used as guides for the air, external to the jet engine, which is introduced into the ejection passage 26 through apertures 30 to mix with the cold and hot flows from the gas generator. Thanks to this contribution of external air, the gas output produced by the jet engine is increased during takeoff of the aircraft.

As illustrated in FIGS. 1 and 2, in each external air intake aperture 30 a scoop 31 is also mounted which is able to pivot about a rotary pin 33.

Each scoop 31 moreover is connected by a rod 35 to lobe 32 corresponding to the external air intake aperture.

Thus, when lobes 32 are deployed in the open position (FIG. 2), scoops 31 pivot with the lobes to admit external air inside the ejection passage 26. In the same way, when the lobes are closed (FIG. 1), scoops 31 pivot in the opposite direction to the lobes and block apertures 30, thus preventing the external air from entering the ejection passage.

Figure 4:
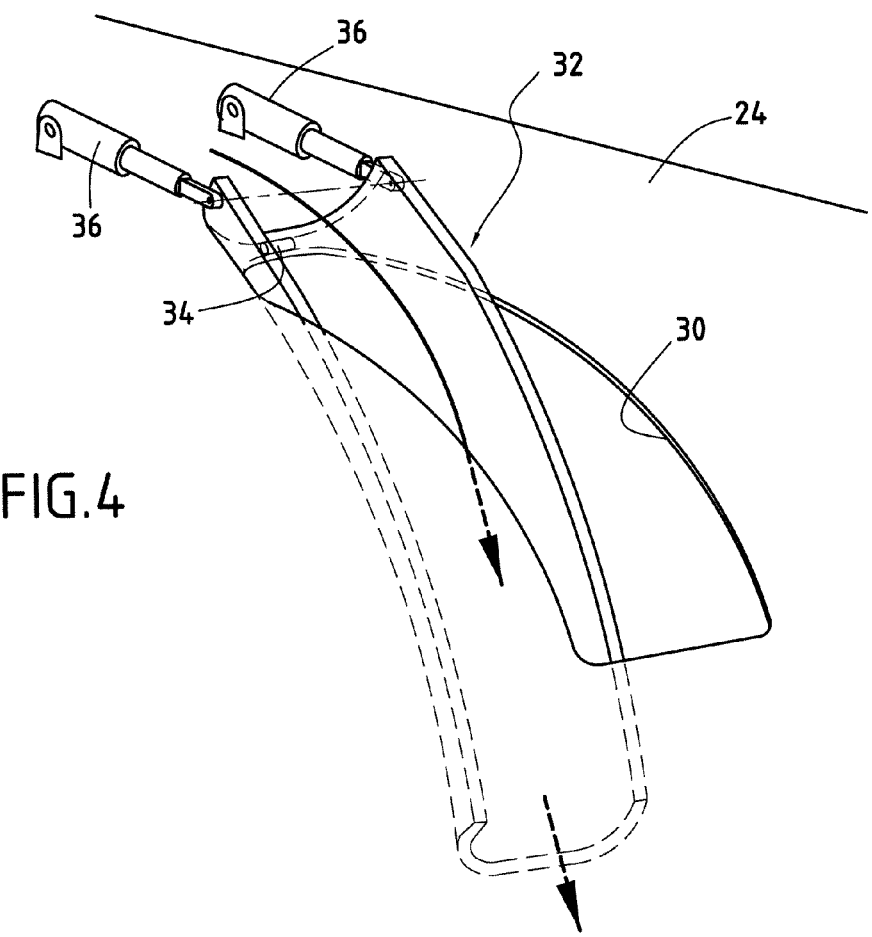

As illustrated in FIGS. 3 and 4, lobes 32 are articulated on the nozzle 24 at their upstream end by means of a rotary pin 34 and are moved into their two positions by means of at least one jack 36 (for example hydraulic, pneumatic or electric). For actuating all lobes 32 of the nozzle 24, the jacks 36 can be synchronized by means of a synchronization cable 38.

According to the invention, lobes 32 have an azimuthal component in the same direction. Azimuthal component is understood to mean that each lobe is curved so that its downstream end deviates from the radial pivoting plane of the lobe. This azimuthal component, defined in relation to the cylindrical shape of the nozzle 24, is particularly visible in FIG. 5 which is a detailed view of lobes 32.

In this FIG. 5, the projection of the lobes on the nozzle 24 is not only parallel to the longitudinal axis X-X: it also presents a pitch θ relative to the latter (the angle θ is non zero). By way of indication, the pitch θ may reach approximately 20°.

As illustrated in FIG. 5, the pitch θ may be variable: for example, it may be steeper at the downstream end than at the upstream end of the lobes (in projection, the lobes can be substantially curved).

Naturally the shape of the apertures 30 of the nozzle 24, in which lobes 32 are mounted, is complementary to the projection of the lobes, that is to say their projection onto the nozzle also has a pitch relative to the longitudinal axis X-X of the jet engine.

Moreover, the azimuthal component is directed in the same direction for all lobes 32. Thus lobes 32 are all "twisted" in the same direction so as to give a swirling motion to the external air admitted into the convergence zone 22 when the lobes are in the second position.

This swirling motion phenomenon produced by the particular shape of the lobes is particularly visible in FIG. 7. In this figure which illustrates the mixer in frontal view it is well noted that the external air admitted into the nozzle 24 undergoes an anticlockwise torsional movement (of course the swirling direction of the air could be different).

The number, shape and length of the lobes, as well as their azimuthal component and their degree of "penetration" into the nozzle when they are in their open position vary according to the application.

In a preferred embodiment, lobes 32 have a substantially U-shaped cross section (that is to say they are semi-cylinders).

Alternatively, the lobes could be semi-cones or ellipsoidal troughs for example.

The invention claimed is:

1. A core exhaust mixer, having a variable area, for turbofan jet engines of supersonic aircraft, comprising a substantially cylindrical nozzle centered on a longitudinal axis (X-X) of the jet engine and intended to be arranged concentrically about a gas generator of the jet engine, the nozzle comprising a plurality of external air intake apertures distributed over its entire circumference, emerging in a convergence zone between the cold and hot flows from the gas generator and in which lobes, movable between two positions, are mounted; a first position in which the lobes block the apertures of the nozzle and a second position, different from the first, in which the lobes unblock said apertures and extend radially into the nozzle in order to admit air, external to the jet engine, into said convergence zone, wherein the lobes have an azimuthal component in the same direction such that each lobe is curved with a downstream end deviating from a radial pivoting plane of the lobe, in order to give a swirling motion to the external air admitted into the convergence zone when the lobes are in the second position.

2. A mixer according to claim 1, in which the lobes have a substantially U-shaped cross section.

3. A mixer according to claim 1, in which each lobe is articulated on the nozzle at an upstream end by a rotary pin and is moved into the two positions by at least one jack.

4. A mixer according to claim 1, in which the nozzle comprises moreover a plurality of pivoting scoops mounted in the apertures and each connected to a lobe.

5. A jet engine for supersonic aircraft, said jet engine comprising a core exhaust mixer having a variable area according to claim 1.

6. A mixer according to claim 1, wherein a projection of each lobe on said nozzle presents a non zero pitch angle relative to said longitudinal axis of the jet engine.

7. A mixer according to claim 6, wherein said pitch angle is steeper at said downstream end than at an upstream end of the lobes.

8. A mixer according to claim 6, wherein said pitch angle is approximately 20°.

* * * * *